Figure 1:
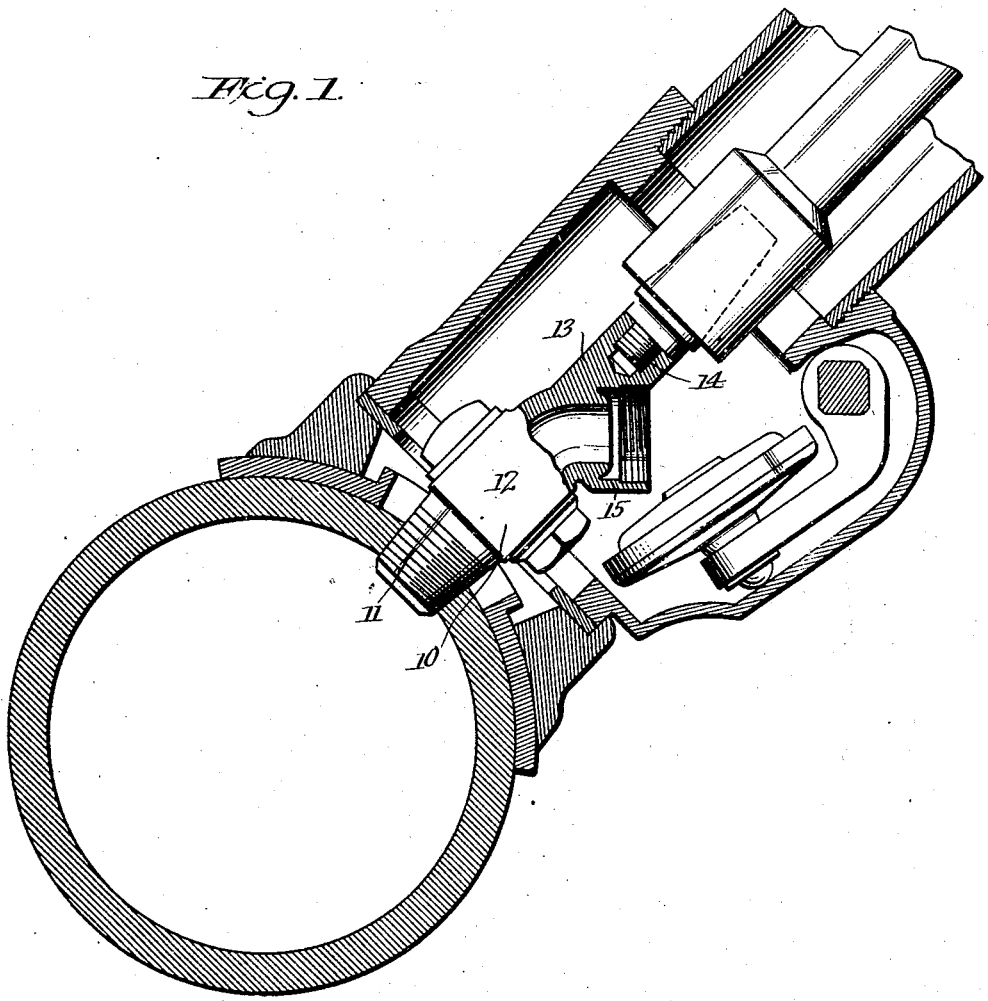

Jan. 13, 1931.  J. W. SIMPSON ET AL  1,789,079
CORPORATION STOP WITH OFFSET CONNECTION
Filed Nov. 29, 1929  2 Sheets-Sheet 1

Inventors
James W. Simpson.
Frank H. Mueller.

By Cushman Bryant & Darby
Attorneys

Jan. 13, 1931.  J. W. SIMPSON ET AL  1,789,079
CORPORATION STOP WITH OFFSET CONNECTION
Filed Nov. 29, 1929  2 Sheets-Sheet 2

Inventors
James W. Simpson.
Frank H. Mueller.

Patented Jan. 13, 1931

1,789,079

UNITED STATES PATENT OFFICE

JAMES WILBUR SIMPSON AND FRANK H. MUELLER, OF DECATUR, ILLINOIS, ASSIGNORS TO MUELLER CO., OF DECATUR, ILLINOIS, A CORPORATION OF ILLINOIS

CORPORATION STOP WITH OFFSET CONNECTION

Application filed November 29, 1929. Serial No. 410,623. REISSUED

This invention relates to corporation stops adapted for use in fluid distribution systems.

It is an object of the invention to produce a compact structure less expensive to manufacture than the well known stop in general use, and one which also has features permitting it to be more easily applied and in much less time.

More specifically, it is an object of the invention to eliminate the use of two or more couplings which are now used to connect the inlet from the main through the stop to the service pipe. This is accomplished in the present construction by means of an offset connection.

Moreover, with stops at present in use, the outlet side is usually threaded to receive the boring tool. In the construction of this invention an independent tool attaching means is provided which is in axial alignment with the inlet side of the stop, and which will permit the stop to be inserted without any danger of distorting the stop or interfering with the outlet connection.

It is an additional object of the invention to overcome the general complaint which now exists as regards the rotation of the service pipe or connection which is connected to the stop. This disadvantageous feature has been eliminated in the present construction by a novel connecting means which will serve to hold the service pipe or other connection firmly in engagement with the stop in fluid-tight communication, and, at the same time, the service pipe or connection will not be capable of rotation so as to interfere with the joint at the opposite end of the service pipe.

Figure 2:
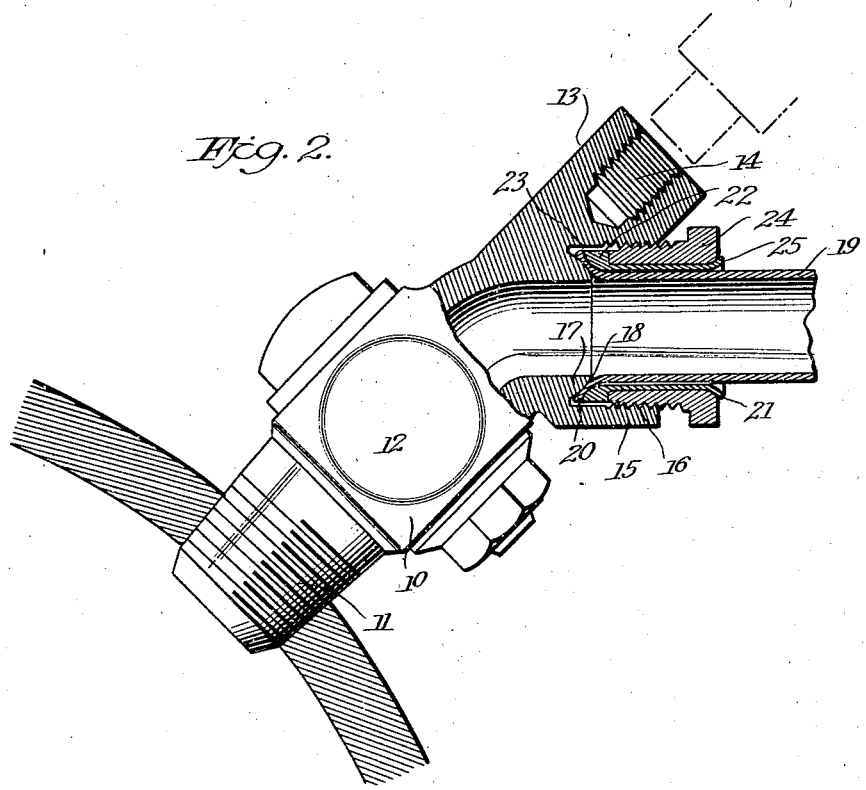
Figure 3:
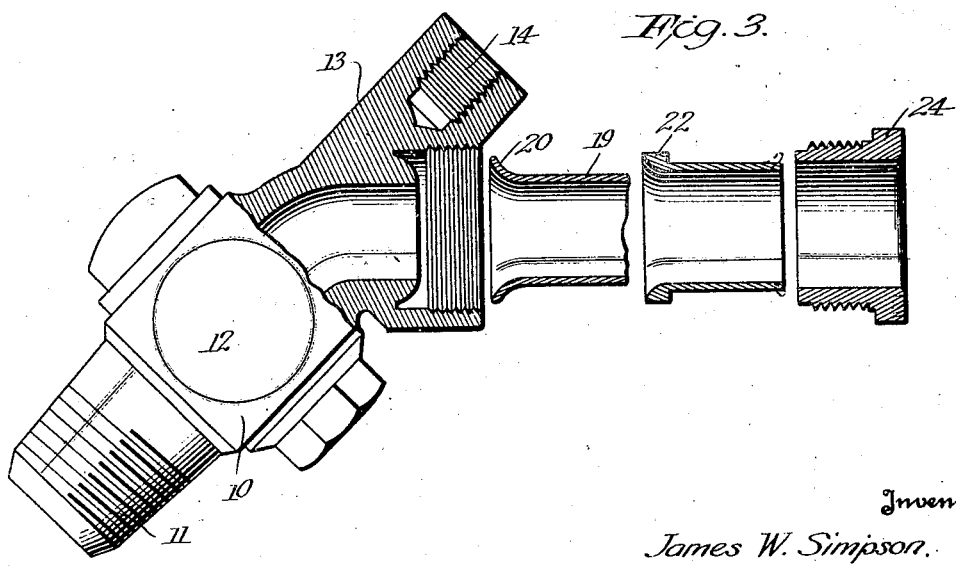

In the drawings:

Figures 1, 2 and 3 are sectional views of the invention.

The stop is indicated as a whole at 10, and is preferably cast in the form shown. An inlet 11 is provided and a valve 12 is employed as usual.

The casting is extended in axial alignment with the inlet 11 to provide a projection or extension 13, and formed in this extension is a socket 14. The socket 14 is shown as threaded, but it may have any irregular internal configuration, as square, hexagonal, or fluted.

The socket 14 receives the usual plug, which is connected to the boring bar of a tapping machine, so that, in order to insert the stop in a main, it is only necessary to apply the usual plug to the socket 14 and operate the tapping machine in the usual manner, as shown in Figure 1.

Formed in the body portion of the stop between the extension 13 and the inlet 11 is an offset connection indicated as a whole at 15. This connection has a recess formed therein which is partially threaded, as shown at 16, and on its interior the recess is provided with a projection or flange 17, the surface of which is curved as shown at 18.

Fitting within the connection and the recess afforded thereby is the service pipe 19, which is the usual copper or lead pipe. At its end the pipe may be flanged, as shown at 20, and is adapted to engage the curved portion 18 of the projection 17. It will be understood that the projection 17 is circular, so that a fluid-tight joint will be formed between the stop and the service pipe.

Loosely disposed within the recess about the service pipe is an elongated ferrule 21. The ferrule 21 is provided at one end with an enlargement or ring 22 having a curved surface 23 corresponding to the curvature, in general, of the projection 17.

It will be understood that the flanged end 20 of the pipe 19 is received between the respective curved surfaces of the projection 17 and the enlarged portion of the ferrule.

The ferrule may be formed of rigid material, or it may be made of some bendable or resilient metal as desired. It is important that the ferrule be of greater interior diameter than the exterior diameter of the pipe 19, in order that it may loosely surround the pipe 19 and permit the pipe 19 to expand under pressure, which may be exerted in various ways, as, for instance, when the flanged portion of the pipe is being clamped between the ferrule and the body portion of the stop.

A nut 24 is adapted to engage the threaded portion of the recess 16 of the connection 15, and the internal diameter of this nut is greater than the external diameter of the ferrule so that the nut may move freely about the ferrule. The nut at its inner end engages the enlarged portion of the ferrule to effect a clamping of the service pipe between the curved surface of the ferrule and the curved surface of the body portion of the stop.

By reason of this construction, as the nut is tightened to clamp the parts, it will not grind upon the service pipe 19, as is usually the case, and cause it to rotate, thereby loosening any connection of the service pipe at its opposite end, which has been a serious difficulty. The nut simply grinds upon the enlargement of the ferrule, and there is insufficient friction to cause the service pipe to rotate.

By having the offset connection it will be understood that where heretofore an elbow requiring two connections has been necessary, but a single joint is now employed.

For example, with the usual design a one-eighth bend or a one-fourth bend coupling is used to carry the service pipe away from the corporation stop in a horizontal plane. The corporation stop, of course, is usually inserted in the main at an angle of about 45° or 23°, and the bent coupling straightens out the service pipe connection. Such a construction was used where the outlet was in alignment with the inlet of the stop and where the outlet provided a means for working the stop into a main. With the present invention the separate bent coupling usually employed is eliminated by setting the connection 15 at an angle of 45° to 23°, as may be desired, and employing the extension 13.

Thus not only is the coupling member which is now generally employed, and which adds to the expense of the construction, completely eliminated, but, moreover, the necessity of providing two joints with the use of a bent connection is likewise overcome.

It will be observed that the ferrule extends beyond the confines of the recess in the body portion, and also extends beyond the longitudinal dimension of the nut, and is flared at its outer end, as shown at 25.

The purpose of this construction, of course, as heretofore described, is to eliminate any possibility of rotating the service pipe or other connecting pipe when it is being clamped to the stop, or when it is being subsequently tightened.

The invention overcomes numerous disadvantages which have heretofore been experienced, and eliminates in a small article of this character items of expense which have heretofore materially added to the cost of installations. Moreover, the construction can be cast without difficulty and does not require the use of any specific type of boring bar or tapping machine for its application.

We claim:

1. A corporation stop comprising a valve, an inlet on one side of the valve and an outlet on the opposite side, a passage controlled by the valve connecting said inlet and outlet and an independent tool attaching means in alignment with said inlet end and arranged on the outlet side of the valve, said valve being transversely disposed across said passage and independent of said tool attaching means.

2. A corporation stop comprising a rotary valve, an inlet on one side of the valve and an outlet on the opposite side, a passage controlled by the valve communicating with said inlet and outlet, and an independent tool attaching means comprising an integral extension in alignment with said inlet end and arranged on the outlet side of the valve, said valve being transversely disposed across said passage at a point remote from said inlet and said tool attaching means.

3. A corporation stop comprising a valve, an inlet on one side of the valve and an outlet on the opposite side, a passage controlled by the valve connecting said inlet and outlet, said outlet opening at an angle with respect to the passage through the stop, and an independent tool attaching means in alignment with said inlet end and arranged on the outlet side of the valve, said valve being transversely disposed across said passage and independent of said tool attaching means.

4. A corporation stop comprising a rotary valve, an inlet on one side of the valve and an outlet on the opposite side, a passage controlled by the valve communicating with said inlet and outlet, said outlet opening at an angle with respect to the passage through the stop, and an independent tool attaching means comprising an integral extension in alignment with said inlet end and arranged on the outlet side of said valve, said valve being transversely disposed across said passage at a point remote from said inlet and said tool attaching means.

5. A corporation stop comprising a rotary valve, an inlet on one side of the valve and an outlet on the opposite side, a passage controlled by the valve and communicating with said inlet and outlet, said stop being adapted to be inserted in a main by rotation, and an independent threaded tool attaching means in axial alignment with said inlet end and adapted to receive a rotatable tool for inserting the stop in the main, said tool attaching means being arranged on the outlet side of said valve and constituting the only point of connection of the rotating tool with the stop, said valve being transversely disposed across said passage at a point remote from said inlet and tool attaching means and independent of said tool attaching means.

6. A corporation stop comprising a valve, an inlet on one side of the valve and an outlet on the opposite side, a passage controlled by the valve communicating with said inlet, and an independent tool attaching means arranged on the outlet side of the valve, said valve being transversely disposed across said passage at a point remote from said inlet and said tool attaching means.

In testimony whereof we have hereunto set our hands.

JAMES W. SIMPSON.
FRANK H. MUELLER.